United States Patent
Wu

(10) Patent No.: US 10,085,175 B2
(45) Date of Patent: Sep. 25, 2018

(54) LOAD CONTROL METHOD AND APPARATUS FOR NOTIFICATION MESSAGES

(71) Applicant: ZTE CORPORATION, Shenzhen, Guangdong Province (CN)

(72) Inventor: Hao Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 100 days.

(21) Appl. No.: 15/319,803

(22) PCT Filed: Aug. 19, 2014

(86) PCT No.: PCT/CN2014/084744
§ 371 (c)(1),
(2) Date: Dec. 19, 2016

(87) PCT Pub. No.: WO2015/131497
PCT Pub. Date: Sep. 11, 2015

(65) Prior Publication Data
US 2017/0142614 A1 May 18, 2017

(30) Foreign Application Priority Data
Jun. 20, 2014 (CN) .......................... 2014 1 0281722

(51) Int. Cl.
*H04L 1/00* (2006.01)
*H04W 28/08* (2009.01)
(Continued)

(52) U.S. Cl.
CPC ........... *H04W 28/08* (2013.01); *H04W 4/005* (2013.01); *H04W 4/70* (2018.02); *H04W 68/005* (2013.01)

(58) Field of Classification Search
CPC ....................................................... H04W 28/08
(Continued)

(56) References Cited

U.S. PATENT DOCUMENTS

2009/0187413 A1* 7/2009 Abels ..................... G06Q 10/10
705/1.1
2010/0131473 A1* 5/2010 Bjork .................. G06F 11/3006
707/690
(Continued)

FOREIGN PATENT DOCUMENTS

| CN | 103518350 A | 1/2014 |
| CN | 103618800 A | 3/2014 |
| CN | 103621113 A | 3/2014 |

OTHER PUBLICATIONS

OneM2M, Device Management using mgmtCmd resource, Inter Digital Communications; Dec. 1, 2013, XP055218080.
(Continued)

*Primary Examiner* — Shripal Khajuria
(74) *Attorney, Agent, or Firm* — Ling Wu; Stephen Yang; Ling and Yang Intellectual Property

(57) ABSTRACT

The present document discloses a load control method for notification messages. The method includes: a common service entity (CSE) setting a maximum storage number of notification messages for the CSE; the CSE creating a first attribute for a subscription resource when the CSE creates the subscription resource; the CSE setting a second attribute of the notification message according to the first attribute of the subscription resource when the CSE generates the notification message for the subscription resource; and the CSE performing load control according to the maximum storage number of the notification messages and second attributes of various stored notification messages when the CSE stores the notification message and the second attribute of the
(Continued)

notification message. The present document also discloses a load control apparatus for notification messages.

14 Claims, 1 Drawing Sheet

(51) Int. Cl.
    *H04W 68/00*     (2009.01)
    *H04W 4/00*     (2018.01)
    *H04W 4/70*     (2018.01)

(58) Field of Classification Search
    USPC ............................................. 370/235
    See application file for complete search history.

(56) References Cited

U.S. PATENT DOCUMENTS

| | | | |
|---|---|---|---|
| 2012/0215560 A1* | 8/2012 | Ofek ................ | G06Q 10/10 |
| | | | 705/3 |
| 2013/0231081 A1* | 9/2013 | Mo ................ | H04L 41/5067 |
| | | | 455/405 |
| 2014/0282586 A1* | 9/2014 | Shear ................ | G06F 9/5072 |
| | | | 718/104 |

OTHER PUBLICATIONS

Machine-to-Machine communications (M2M); Functional architecture, ETSI TS 102 690 V2.1.1; Oct. 2013, XP055218086.
OneM2M, CMDH Refinement, Josef Blanz et al., Oct. 3, 2013, XP084003423.

* cited by examiner

LOAD CONTROL METHOD AND APPARATUS FOR NOTIFICATION MESSAGES

TECHNICAL FIELD

The present document relates to a load control technology for a Machine Type Communication (MTC) terminal, and in particular to a load control method and apparatus for notification messages.

BACKGROUND

The Machine to Machine (abbreviated as M2M) communication network is composed of various M2M nodes and the bearer network. The M2M nodes communicate with each other through the bearer network, and one M2M node at least includes: one application entity or one common service entity.

The application entity is a logic unit for executing the actual M2M application, and the common service entity is a logic unit for performing the management and service on the application.

In the M2M system architecture, the application node is an execution node at the end, such as, a smart meter, a temperature measurement and control sensor, a fire alarm, an intelligent home appliance, and so on, the intermediate node is a middleware for connecting the execution node at the end to a server at the network side, such as, a gateway, the basis node is the server the network side, and the application entity registered on the basis node usually is the management software or management platform of the M2M service provider.

The communication among the M2M applications is achieved through the interaction among the common service entities (CSE), while the premise of the communication is that the M2M applications first need to be registered in the local CSE, for example: the application entity on the application node needs to be registered in the CSE on the intermediate node, and the CSE node on the intermediate node is the local CSE of the application entity on the application node, and then the interaction among the M2M applications is achieved through the communication among the CSEs, as the M2M system architecture diagram shown in FIG. 1, including: an application node, an intermediate node, and a basis node. herein, the application node is a physical entity, and the application entity (AE) is a logical unit, which is a logical unit that really executes the application on the application node which is the physical entity.

When the AE is registered in the local CSE, the AE needs to provide a security certificate that can identify its own legitimacy to the local CSE for verification, and it can be registered in the local CSE only when the verification is passed, and the AE further needs to provide the registered name suggested by the AE to the local CSE for reference.

The AE after registration can also create resources related to the applications on the local CSE, as the sub-resources of the application resources, for example: the AE after registration creates the resource "application" on the local CSE, in order to store the data of the application, the AE can also create a resource "container" under the resource "application", and the resource "container" is used to store the data related to the AE. The AE can acquire a message that indicates whether a certain resource is changed in the subscription mode. When the attribute or sub-resource of the subscripted resource is changed, for example, the attribute value is modified, the sub-resource is deleted, or a new sub-resource is created, etc., the CSE where the subscripted resource is located can send a notification message to the AE, to inform that the subscription resource has been modified.

The subscription to the resource is achieved by the AE creating the sub-resource of which the type is "subscription" under the resource of the CSE. The resources subscripted by the AE may contain more attributes and sub-resources, so the subscripted resources may be frequently modified, and the notification message will be sent to the AE at every modification according to the subscription rules of the existing technology, and thus resulting that a large number of notification messages are brought and stored on the CSE.

SUMMARY

In order to solve the current existing technical problems, the embodiment of the present document mainly provides a load control method and apparatus for notification messages.

The technical scheme of the embodiment of the present document is realized in following way:

The embodiment of the present document provides a load control method for notification messages, including:

a common service entity, CSE, setting a maximum storage number of notification messages for the CSE, and when a subscription resource is created, creating a first attribute for the subscription resource;

when generating a notification message for the subscription resource, the CSE setting a second attribute of the notification message according to the first attribute of the subscription resource; and when storing the notification message and the second attribute of the notification message, the CSE performing load control according to the maximum storage number of the notification messages and second attributes of various stored notification messages.

The embodiment of the present document provides a load control apparatus for notification messages, including: a configuration module, an attribute creation module, a notification message generation module and a storage control module; herein, the configuration module is arranged to set a maximum storage number of notification messages;

the attribute creation module is arranged to, when a subscription resource is created, create a first attribute for the subscription resource;

the notification message generation module is arranged to generate a notification message for the subscription resource, and set a second attribute of the notification message according to the first attribute of the subscription resource, and send the notification message and the second attribute of notification message to the storage control module; and the storage control module is arranged to, when the notification message and the second attribute of the notification message are stored, perform load control according to the maximum storage number of the notification messages and second attribute of various stored notification messages.

The embodiment of the present document provides a load control method and apparatus for notification messages, a CSE sets a maximum storage number of notification messages for the CSE; the CSE creating a first attribute for a subscription resource when the CSE creates the subscription resource; the CSE sets a second attribute of the notification message according to the first attribute of the subscription resource when the CSE generates notification message for the subscription resource; and the CSE performs load control according to the maximum storage number of the notification messages and the second attributes of various stored notification messages when the CSE stores the notification message and the second attribute of the notification message. So, the CSE can control the number of the notification messages stored by itself, to avoid a large number of notification messages being stored in the CSE which causes the overload of the entire CSE and thus makes the running of the CSE to be crashed.

SPECIFIC EMBODIMENTS

Figure 1:
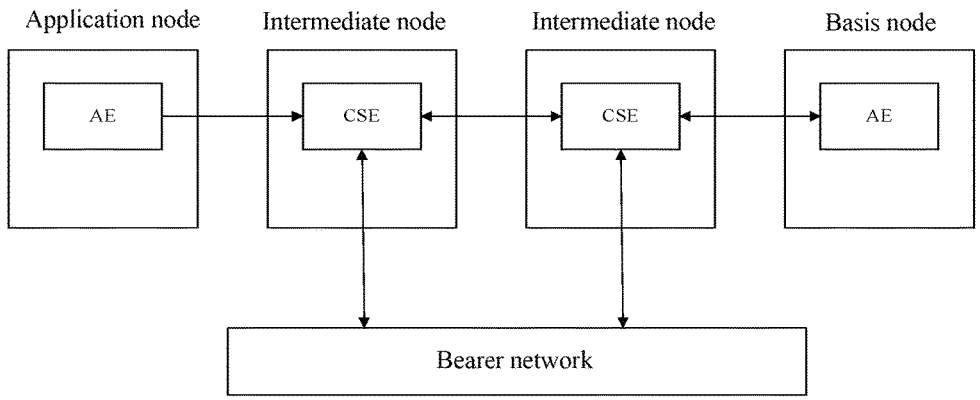
FIG. 1 is a system architecture diagram of an M2M.

In general, the steps of the CSE creating a subscription resource for the AE are as follows.

In step 1, the AE1 sends a subscription resource creating request to the CSE, and the subscription resource creating request includes:

1) resource name: "myApplication1";
2) resource type: "Application";
3) where to be created: \\CSEBase;
4) content: including attributes that are required to be created for the subscription resources.

In step 2, the CSE receives the subscription resource creating request of the AE1; when it is verified that AE1 has the permission for creating a subscription resource, the subscription resource is created under a resource directory of the CSE, \\CSEBase; and the name of the subscription resources is set as "myApplication1", and the resource type is set as "Application", and the attribute of the subscription resource "myApplication1" are created according to the contents in the subscription resource creating request.

In step 3, the AE2 sends a subscription resource creating request to the CSE, and the subscription resource creating request contains:

1) resource name: "myApplication2";
2) resource type: "Application";
3) where to be created: \\CSEBase;
4) content: including attributes that are required to be created for the subscription resources.

In step 4, the CSE receives a subscription resource creating request of the AE2; when it is verified that AE2 has permission for creating a resource, a subscription resource is created under a resource directory of the CSE, \\CSEBase; and the name of the subscription resources is set as "myApplication2", and the resource type is set as "Application", and the attribute of the subscription resource"myApplication2" is created according to the contents of the subscription resource creating request.

In step 5, the AE3 sends a subscription resource creating request to the CSE, and the subscription resource creating request contains:

1) resource name: "myApplication3";
2) resource type: "Application";
3) where to be created: \\CSEBase;
4) content: including attributes that are required to be created for the subscription resources.

In step 6, the CSE receives a subscription resource creating request of the AE3; when it is verified that AE3 has the permission for creating a resource, a subscription resource is created under a resource directory of the CSE, \\CSEBase; and the name of the subscription resources is set as "myApplication3", and the resource type is set as "Application", and the attribute of the subscription resource "myApplication3" is created according to the contents of the subscription resource creating request.

In the embodiment of the present document, the CSE sets a maximum storage number of notification messages for the CSE; the CSE creates a first attribute for subscription resource when the CSE creates the subscription resource; the CSE sets a second attribute of the notification message according to the first attribute of the subscription resource when the CSE generates a notification message for the subscription resource; and when the CSE stores the notification message and the second attribute of the notification message, the CSE performs load control according to the maximum storage number of the notification messages and the second attributes of various stored notification messages.

The present document is further illustrated in details through the accompanying drawings and specific embodiments.

Figure 2:
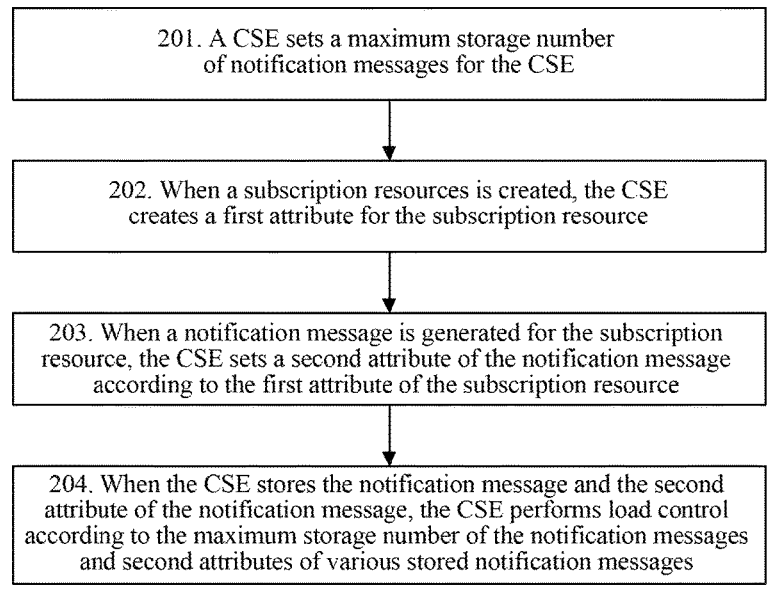
FIG. 2 is a flow chart of a load control method for notification messages according to an embodiment of the present document.

The embodiment of the present document realizes a load control method for notification messages. As shown in FIG. 2, the method includes the following steps.

In step 201: the CSE sets a maximum storage number of notification messages for the CSE itself.

Herein, the maximum storage number of the notification message can be set according to a performance of the CSE.

In step 202: when a subscription resource is created, the CSE creates a first attribute for the subscription resource.

Herein, the first attributes include: a priority and an effective time.

In step 203: when the CSE generates a notification message for the subscription resource, the CSE sets a second attribute of the notification message according to the first attribute of the subscription resource.

Specifically, when change occurs in at least one of a sub-resource of the subscription resource or an attribute of the subscription resource, the CSE generates the notification message for the subscription resource and the CSE sets the second attribute of the notification message according to the first attribute of the subscription resource, herein, the second attributes include: a notification message effective time, a notification message priority and a notification message creation time; herein, the notification message effective time is set as an effective time for generating the notification message in the first attribute of the subscription resource; the notification message priority is set as a priority for generating the notification message in the first attributes of the subscription resources; and the notification message creation time is set as time for generating the notification message.

In step 204: the CSE performs load control according to the maximum storage number of the notification messages and the second attributes of various stored notification messages when the CSE stores the notification message and the second attribute of the notification messages.

Specifically, when number of notification messages stored by the CSE does not reach the maximum storage number of the notification message, each notification message newly generated, and a notification message effective time, a notification message priority and a notification message creation time of the notification message newly generated are stored.

When the number of the notification messages stored by the CSE reaches the maximum storage number of the notification messages, the CSE reads the notification message newly generated and a notification message effective time, a notification message priority and a notification message creation time of each of the stored notification messages, and deletes a notification message of which notification message priority is the lowest from the stored notification messages and the notification message newly generated;

if there are more than two notification messages with the lowest notification message priority, then it is to compare the notification message effective time of all notification messages with the lowest notification message priority, and a notification message of which the notification message effective time is closest to the current time is deleted; here, the being closest to the current time can be that a difference with the current time is a specified threshold time, such as, a difference of 1 day, or 1 hour, or 10 minutes, etc.

If there are more than two notification messages with the lowest notification message priority and all the notification message effective times satisfy condition of being closest to the current time, then it is to compare the notification message creation times of the more than two notification messages, and a notification message of which the notification message creation time is earliest is deleted.

Figure 3:
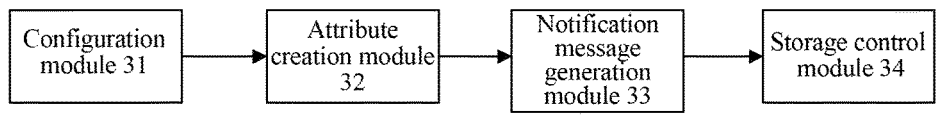
FIG. 3 is a structure diagram of a load control apparatus for notification messages according to an embodiment of the present document.

In order to realize the above method, the present document further provides a load control apparatus for notification messages, which is arranged on the CSE of the intermediate node, as shown in FIG. 3, including: a configuration module 31, an attribute creation module 32, a notification message generation module 33 and a storage control module 34; herein, the configuration module 31 can be realized by a memory and is arranged to set a maximum storage number of the notification messages; herein, the maximum storage number of the notification message can be set according to the performance of the CSE.

The attribute creation module 32 can be realized by a controller and is arranged to, when a subscription resource is created, create a first attribute for the subscription resource; herein, the first attribute include: a priority and an effective time.

The notification message generation module 33 can be realized by the controller and is arranged to generate a notification message for the subscription resource, and set the second attribute of the notification message according to the first attribute of the subscription resource, and send the notification message and the second attribute of the notification message to the storage control module 34.

Specifically, the notification message generation module 33 is specifically arranged to: when detecting that a change occurs in at least one of a sub-resource of the subscription resource or an attribute of the subscription resource, generate a the notification message for the subscription resource, and set the second attribute of the notification message according to the first attribute of the subscription resource, herein, the second attribute include: a notification message effective time, a notification message priority and a notification message creation time; herein, the notification message effective time is set as effective time for generating the notification message in the first attributes of the subscription resources; the notification message priority is set as a priority for generating the notification message in the first attributes of the subscription resources; and the notification message creation time is set as a time for generating the notification message.

The storage control module 34 can be realized by the memory and is arranged to perform load control according to the maximum storage number of the notification messages and the second attributes of various stored notification messages when the notification message and the second attribute of the notification message are stored.

Specifically, when number of notification messages stored by the CSE does not reach the maximum storage number of the notification message, the storage control module 34 stores each notification message newly generated, and notification message effective time, notification message priority and notification message creation time of notification message newly generated.

When the number of the stored notification messages reaches the maximum storage number of the notification messages, the storage control module 34 reads the notification message newly generated and stored notification message effective time, notification message priority and notification message creation time of every notification message, and deletes a notification message of which notification message priority is the lowest from the stored notification messages and the newly generated notification messages.

If there are more than two notification messages with the lowest notification message priority, then the storage control module compares the notification message effective time of all notification messages with the lowest notification message priority, and deletes a notification message of which the notification message effective time is closest to the current time; here, the being closest to the current time can be that a difference with the current time is a minimum and same time, or a difference with the current time is a specified threshold time, such as, a difference of 1 day, or 1 hour, or 10 minutes, etc.

If there are more than two notification messages with the lowest notification message priority and all the notification message effective times satisfy condition of being closest to the current time, then the storage control module compares the notification message creation times of the more than two notification messages, and deletes a notification message of which the notification message creation time is earliest.

The specific application of the present document is explained in detail by combining with the embodiments hereinafter.

The load control method for notification messages realized by the present embodiment can be the following procedures.

In step 301, the AE1 sends a subscription resource creating request to the CSE, and the subscription resource creating request including:
1) resource name: "mySubscription1";
2) resource type: "Subscription";
3) where to be created: \\CSEBase\myApplication1;
4) content: including the attributes that are required to be created for the subscription resources and names and values of the following parameters:
priority: set as 1;
effective time: May 22, 2014 23: 59.

In step 302, the CSE receives the subscription resource creating request of the AE1; when it is verified that AE1 has the permission for creating a resource, the sub-resource "mySubscription1" is created under the resource "myApplication1", and the first attribute is set, herein, the priority is set as 1, and the effective time is set as May 22, 2014 23: 59.

In step 303, the AE2 sends a subscription resource creating request to the CSE, and the subscription resource creating request including:
1) resource name: "mySubscription2";
2) resource type: "Subscription";
3) where to be created: \\CSEBase\myApplication2;
4) content: including the attributes that are required to be created for the subscription resources and names and values of the following parameters:
priority: set as 2;
effective time: May 22, 2014 23: 59.

In step 304, the CSE receives the subscription resource creating request of the AE2; when it is verified that AE2 has permission for creating a subscription resource, the sub-resource "mySubscription2" is created under the resource "myApplication2", and the first attribute is set, herein, the priority is set as 2, and the effective time is set as May 22, 2014 23: 59.

In step 305, the AE3 sends a subscription resource creating request to the CSE, and the subscription resource creating request includes:

1) resource name: "mySubscription3";
2) resource type: "Subscription";
3) where to be created: \\CSEBase\myApplication3;
4) content: including the attributes that are required to be created for the subscription resources and names and values of the following parameters:

priority: set as 1;
effective time: May 21, 2014 23: 59.

In step 306, the CSE receives the subscription resource creating request of the AE3; when it is verified that AE3 has the permission for creating a resource, the sub-resource "mySubscription3" is created under the resource "myApplication3", and a first attribute is set, herein, the priority is set as 3, and the effective time is set as May 21, 2014 23: 59.

At this time, the resources "myApplication1", "myApplication2" and "myApplication3" are called as the subscription resources.

The rules: priority 2 is higher than priority 1.

In step 307, when the attributes or sub-resources of the resources "myApplication1", "myApplication2" and "myApplication3" on the CSE are changed, the CSE generates the notification message for each subscription resource, and sets the second attribute of each notification message according to the first attribute of each subscription resource, herein, the notification message effective time is set as an effective time for generating the notification message in the first attribute of the subscription resource; the notification message priority is set as a priority for generating the notification message in the first attribute of the subscription resource; and the notification message creation time is set as a time for generating the notification message.

When the network fails, and causes that the notification messages cannot be transmitted to the AE1, AE2 and AE3, the CSE stores the generated notification messages.

In step 308, the CSE preset the maximum storage number of the notification messages, which is used for indicating the maximum number of the notification messages that can be stored on the CSE. Here, step 308 generally can set the maximum storage number of the notification messages at the first beginning.

In step 309, the CSE performs load control according to the maximum storage number of the notification messages and the second attributes of various stored notification messages when the CSE stores the notification messages and the second attributes of the notification messages;

herein, if the number of the notification messages stored on the current CSE does not reach the maximum storage number of the notification messages, when a new notification message is generated then the notification message newly generated is stored directly;

if the number of the notification messages stored on the current CSE reaches the maximum storage number of the notification messages, it is assumed that the currently stored notification messages include the notification messages, Notification2-1, . . . , Notification2-max, which are generated for the resource "mySubscription2", when the resource "mySubscription1" generate a new notification message, Notification1-1, because the priority of the Notification1-1 is 1, which is lower than the priority of the notification message generated for "mySubscription1", which is 2, then the notification message newly generated, Notification1-1 is deleted.

if the number of the notification messages stored on the current CSE reaches the maximum storage number of the notification messages, it is assumed that the currently stored notification messages include the notification messages, Notification1-1, . . . , Notification1-*n*, which are generated for the resource "mySubscription1" and the notification messages, Notification2-1, . . . , Notification2-*m*, which are generated for the resource"mySubscription2", when the resource "mySubscription3" generate a new notification message, Notification3-1, the priority of the new notification message is 1, which is same with the priorities of the currently stored Notification1-1, . . . , Notification1-*n*, and then the notification message effective times of the notification messages with a priority of 1 are compared; compared to the effective time of Notification1-1, . . . , Notification1-*n*, "May 22, 2014" 23: 59", the effective time of Notification3-1, "May 21, 2014 23: 59" is much closer to the current time, then the Notification3-1 is deleted.

if the number of the notification messages stored on the current CSE reaches the maximum storage number of the notification messages, it is assumed that the currently stored notification messages contain the notification messages, Notification1-1, . . . , Notification1-*n*, which are generated by the resource "mySubscription1" and the notification message, Notification3-1, which is generated by the resources "mySubscription3", when the resource "mySubscription2" generate a new notification message, Notification2-1, the priority of the new notification message is 2, which is higher than the priorities of the currently stored Notification1-1, . . . , Notification1-*n* and Notification3-1, and then the notification message effective times of the notification messages with a priority of 1 are compared; compared to the effective time of Notification1-1, . . . , Notification1-*n*, "May 22, 2014" 23: 59", the effective time of Notification3-1, "May 21, 2014 23: 59" is much closer to the current time, then the Notification3-1 is deleted.

if the number of the notification messages stored on the current CSE reaches the maximum storage number of the notification messages, it is assumed that the currently stored notification messages contain the notification messages, Notification1-1, . . . , Notification1-*n*, which are generated by the resources "mySubscription1" and the notification messages, Notification3-1, . . . , Notification3-*m*, which are generated by the resources "mySubscription3", when the resources "mySubscription2" generate a new notification message, Notification2-1, the priority of the new notification message is 2, which is higher than the priorities of the currently stored Notification1-1, . . . , Notification1-*n* and Notification3-1, . . . , Notification3-*m*, and then the "notification message effective times" of the notification messages with a priority of 1 are compared; compared to the effective time of Notification1-1, . . . , Notification1-*n*, "May 22, 2014" 23: 59", the effective time of Notification3-1, . . . , Notification3-*m*, "May 21, 2014 23: 59" is much closer to the current time, and then the notification message creation times of Notification3-1, . . . , Notification3-*m* are compared, it is assumed that the smaller number is expressed to be created earlier in the present embodiment, then the notification message Notification3-1 is deleted.

The above description is only a better embodiment of the present document, not used to limit the protection scope of the present document. All of modifications, equivalents and/or variations without departing from the spirit and essence of the present document should be embodied in the scope of the appending claims of the present document.

INDUSTRIAL APPLICABILITY

Combining with various embodiments of the present document, the CSE can control the number of the notification messages stored by itself, to avoid a large number of notification messages being stored in the CSE which causes the overload of the entire CSE, and thus preventing the running of the CSE to be crashed.

What I claim is:

1. A load control method for notification messages, comprising:
   setting, by a common service entity, CSE, a maximum storage number of notification messages for the CSE, and when a subscription resource is created, creating a first attribute for the subscription resource;
   when generating a notification message for the subscription resource, setting, by the CSE, a second attribute of the notification message according to the first attribute of the subscription resource; and
   when storing the notification message and the second attribute of the notification message, performing, by the CSE, load control according to the maximum storage number of the notification messages and second attributes of various stored notification messages.

2. The load control method according to claim 1, wherein, the first attribute comprises: a priority and an effective time.

3. The load control method according to claim 2, wherein, when generating a notification message for the subscription resource, setting, by the CSE, a second attribute of the notification message according to the first attribute of the subscription resource comprises: when a change occurs in at least one of a sub-resource of the subscription resource or an attribute of the subscription resource, the CSE generating the notification message for the subscription resource, and the CSE setting the second attribute of the notification message according to the first attribute of the subscription resource, wherein, the second attribute comprises: a notification message effective time, a notification message priority and a notification message creation time; wherein, the notification message effective time is set as an effective time for generating the notification message in the first attribute of the subscription resource message; the notification message priority is set as a priority for generating the notification message in the first attribute of the subscription resource e; and the notification message creation time is set as a time for generating the notification message.

4. The load control method according to claim 3, wherein, said performing load control according to the maximum storage number of the notification messages and second attributes of various stored notification messages comprise: when a number of notification messages stored by the CSE does not reach the maximum storage number of the notification message, storing each notification message newly generated and a notification message effective time, a notification message priority and a notification message creation time of the notification message newly generated.

5. The load control method according to claim 3, wherein, said performing load control according to the maximum storage number of the notification messages and second attributes of various stored notification messages comprise:
   when a number of notification messages stored by the CSE reaches the maximum storage number of the notification messages, the CSE reading a notification message newly generated and a notification message effective time, a notification message priority and a notification message creation time of each of stored notification messages, and deleting a notification message of which a notification message priority is the lowest from the stored notification messages and the notification message newly generated.

6. The load control method according to claim 5, further comprising:
   if there are more than two notification messages with the lowest notification message priority, comparing notification message effective time of all notification messages with the lowest notification message priority, and deleting a notification message of which the notification message effective time is closest to a current time.

7. The load control method according to claim 6, further comprising:
   if there are more than two notification messages with the lowest notification message priority and the notification message effective times satisfy a condition of being closest to the current time, comparing notification message creation times of the more than two notification messages, and deleting a notification message of which the notification message creation time is earliest.

8. A load control apparatus for notification messages, comprising: a configuration module, an attribute creation module, a notification message generation module and a storage control module; wherein,
   the configuration module is arranged to set a maximum storage number of notification messages;
   the attribute creation module is arranged to, when a subscription resource is created, create a first attribute for the subscription resource;
   the notification message generation module is arranged to generate a notification message for the subscription resource, and set a second attribute of the notification message according to the first attribute of the subscription resource, and send the notification message and the second attribute of the notification message to the storage control module; and
   the storage control module is arranged to, when the notification message and the second attribute of the notification message are stored, perform load control according to the maximum storage number of the notification messages and second attributes of various stored notification messages.

9. The load control apparatus according to claim 8, wherein, the first attribute comprise: a priority and an effective time.

10. The load control apparatus according to claim 9, wherein, the notification message generation module is arranged to: when detecting that a change occurs in at least one of a sub-resource of the subscription resource or an attribute of the subscription resource, generate the notification message for the subscription resource, and set the second attribute of the notification message according to the first attribute of the subscription resource, wherein, the second attribute comprise: a notification message effective time, a notification message priority and a notification message creation time; wherein, the notification message effective time is set as effective time for generating the notification messages in the first attribute of the subscription resource; the notification message priority is set as a priority for generating the notification message in the first attributes of the subscription resource; and the notification message creation time is set as a time for generating the notification message.

11. The load control apparatus according to claim 10, wherein, the storage control module is arranged to: when a number of stored notification messages does not reach the maximum storage number of the notification messages, store each notification message newly generated, and a notification message effective time, a notification message priority and a notification message creation time of the notification message newly generated.

12. The load control apparatus according to claim 10, wherein, the storage control module is arranged to: when a number of stored notification messages reaches the maximum storage number of the notification messages, read a notification message newly generated and a notification message effective time, a notification message priority and a notification message creation time of each of stored notification messages, and delete a notification message of which a notification message priority is the lowest from the stored notification messages and the notification message newly generated.

13. The load control apparatus according to claim 12, wherein, the storage control module is further arranged to: determine that there are more than two notification messages with the lowest notification message priority, compare notification message effective times of all notification messages with the lowest notification message priority, and delete a notification message of which the notification message effective time is closest to a current time.

14. The load control apparatus according to claim 13, wherein, the storage control module is further arranged to: determine that there are more than two notification messages with the lowest notification message priority and the notification message effective times satisfy a condition of being closest to the current time, compare notification message creation times of the more than two notification messages, and delete a notification message of which the notification message creation time is earliest.

* * * * *